(12) United States Patent
Lavanant et al.

(10) Patent No.: US 10,426,191 B2
(45) Date of Patent: Oct. 1, 2019

(54) SMOKING ARTICLE INCLUDING FLAVOUR GRANULES HAVING PERMEABLE OUTER LAYER

(71) Applicant: PHILIP MORRIS PRODUCTS S.A., Neuchatel (CH)

(72) Inventors: Laurent Lavanant, Evian-les-Bains (FR); Clement Besso, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 325 days.

(21) Appl. No.: 15/034,982

(22) PCT Filed: Dec. 16, 2014

(86) PCT No.: PCT/EP2014/078024
§ 371 (c)(1),
(2) Date: May 6, 2016

(87) PCT Pub. No.: WO2015/091523
PCT Pub. Date: Jun. 25, 2015

(65) Prior Publication Data
US 2016/0286850 A1    Oct. 6, 2016

(30) Foreign Application Priority Data

Dec. 20, 2013  (EP) .................................... 13199226

(51) Int. Cl.
*A24B 15/00*   (2006.01)
*A24D 3/06*    (2006.01)
(Continued)

(52) U.S. Cl.
CPC .......... *A24B 15/283* (2013.01); *A24B 15/302* (2013.01); *A24D 1/002* (2013.01);
(Continued)

(58) Field of Classification Search
CPC .... A24B 15/283; A24B 15/302; A24D 1/002; A24D 3/06; A24D 3/061; A24D 3/048;
(Continued)

(56) References Cited

U.S. PATENT DOCUMENTS 4,201,756 A * 5/1980 Saeman ................ C01B 11/068
                                                          252/1
4,281,671 A     8/1981 Bynre
(Continued)

FOREIGN PATENT DOCUMENTS

CN   101513271   8/2009
CN   102140387   8/2011
(Continued)

OTHER PUBLICATIONS

Office Action issued in China for Application No. 201480065455.X dated Jul. 3, 2017 (14 pages). English translation included.
(Continued)

*Primary Examiner* — Linda L Gray
(74) *Attorney, Agent, or Firm* — Mueting, Raasch & Gebhardt, P.A.

(57) ABSTRACT

A method for the production of a flavor granule for a smoking article comprises the steps of: a) forming an inner core by compaction of particles of herbaceous plant material; b) providing a coating suspension of colored binder particles comprising at least one colorant and at least one polymeric binder in a solvent; c) applying the coating suspension to the outer surface of the inner core to form an outer layer, wherein the coating suspension is applied to the inner core within a coating system and wherein within that coating system the vapor pressure of the solvent is greater than 5 kPa; and d) drying the outer layer to evaporate the solvent.

11 Claims, 1 Drawing Sheet

Figure 1:
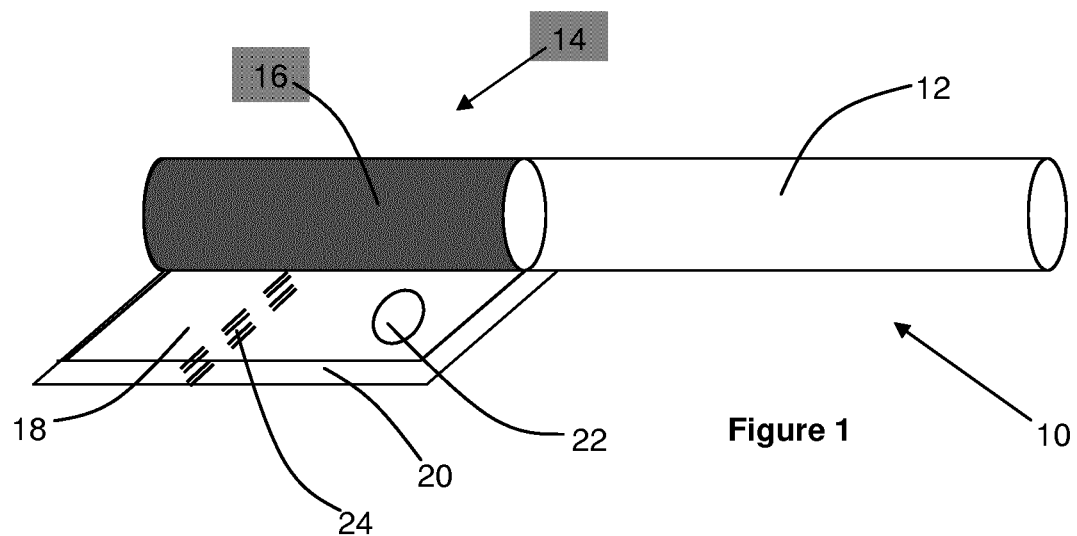

(51) Int. Cl.
  *A24D 1/00* (2006.01)
  *B01J 13/00* (2006.01)
  *A24B 15/28* (2006.01)
  *A24B 15/30* (2006.01)
  *B01J 13/04* (2006.01)

(52) U.S. Cl.
  CPC .............. *A24D 3/06* (2013.01); *A24D 3/061* (2013.01); *B01J 13/04* (2013.01)

(58) Field of Classification Search
  CPC .. A24D 3/068; A24D 3/10; A24D 3/14; B01J 13/04
  USPC ............... 131/275, 276, 332, 340, 342, 345
  See application file for complete search history.

(56) References Cited

U.S. PATENT DOCUMENTS

| | | | |
|---|---|---|---|
| 5,396,911 | A | 3/1995 | Casey, III |
| 5,972,507 | A | 10/1999 | Morimoto |
| 6,120,536 | A | 9/2000 | Ding |
| 6,274,162 | B1 | 8/2001 | Steffenino |
| 7,074,170 | B2 | 7/2006 | Lanier, Jr. |
| 8,375,959 | B2 | 2/2013 | Dittrich |
| 9,675,102 | B2 | 6/2017 | Hunt |
| 10,051,884 | B2 | 8/2018 | Karles |
| 2002/0032477 | A1 | 3/2002 | Helmus |
| 2006/0165988 | A1* | 7/2006 | Chiang ................. B82Y 30/00 428/402.2 |

FOREIGN PATENT DOCUMENTS

| | | |
|---|---|---|
| EP | 1571933 | 3/2007 |
| EP | 2401929 | 1/2012 |
| EP | 2462822 | 6/2012 |
| JP | 10-052502 | 2/1998 |
| JP | 10-506560 | 6/1998 |
| JP | 10182842 | 7/1998 |
| JP | 2013-523087 | 6/2013 |
| JP | 2013-536697 | 9/2013 |
| RU | 2097996 | 12/1997 |
| RU | 2302805 | 7/2007 |
| WO | WO 2008/121610 | 10/2008 |
| WO | WO 2009/022232 | 2/2009 |
| WO | WO 2010/107613 | 9/2010 |
| WO | WO 2011/117738 | 9/2011 |

OTHER PUBLICATIONS

Office Action issued in Russia for Application No. 2016127907 dated Jun. 28, 2018 (11 pages). English translation included.

PCT Search Report and Written Opinion for PCT/EP2014/078024 dated Mar. 19, 2015 (8 pages).

European Extended Search Report for Application No. 13199226.5 dated May 28, 2014 (7 pages).

Office Action issued in Japan for Application No. 2016-534937 dated Nov. 1, 2018 (12 pages). English translation included.

Office Action issued in Japan for Application No. 2016-534937 dated Jul. 25, 2019 (6 pages). English translation included.

* cited by examiner

SMOKING ARTICLE INCLUDING FLAVOUR GRANULES HAVING PERMEABLE OUTER LAYER

This application is a U.S. National Stage Application of International Application No. PCT/EP2014/078024, filed Dec. 16, 2014, which was published in English on Jun. 25, 2015, as International Patent Publication WO 2015/091523 A1. International Application No. PCT/EP2014/078024 claims priority to European Application No. 13199226.5 filed Dec. 20, 2013.

The present invention relates to a smoking article including a plurality of flavour granules having a permeable outer layer formed of a plurality of coloured binder particles. The invention further relates to a method for the production of flavour granules having a permeable outer layer formed a plurality of coloured binder particles, and to a flavour granule produced by such a method.

Filter cigarettes typically comprise a rod of tobacco cut filler surrounded by a paper wrapper and a cylindrical filter aligned in end-to-end relationship with the wrapped tobacco rod, with the filter attached to the tobacco rod by tipping paper. In conventional filter cigarettes, the filter may consist of a plug of cellulose acetate tow wrapped in porous plug wrap. Filter cigarettes with multi-component filters that comprise two or more segments of filtration material for the removal of particulate and gaseous components of the mainstream smoke are also known.

A number of smoking articles in which tobacco is heated rather than combusted have also been proposed in the art. In heated smoking articles, an aerosol is generated by heating an aerosol generating substrate, such as tobacco. Known heated smoking articles include, for example, smoking articles in which an aerosol is generated by electrical heating or by the transfer of heat from a combustible fuel element or heat source to an aerosol forming substrate. During smoking, volatile compounds are released from the aerosol forming substrate by heat transfer from the heat source and entrained in air drawn through the smoking article. As the released compounds cool they condense to form an aerosol that is inhaled by the consumer. Also known are smoking articles in which a nicotine-containing aerosol is generated from a tobacco material, tobacco extract or other nicotine source, without combustion and in some cases without heating, for example through a chemical reaction.

To enhance the flavour of the mainstream smoke, it is known to provide smoking articles with flavourants, for example, in the filter. In particular, it has been proposed to include flavourants in the form of plant material, such as leaves, seeds or roots, from one or more aromatic plants.

Smoking articles in which the filter wrapper has been adapted such that the flavourant within the filter is visible to the consumer are known. For example, it has been proposed to use a transparent filter wrapper so that at least a part of the filter including the flavourant is displayed. Certain types of flavourant may not be considered to be visually appealing and it may not be desirable for such flavourants to be visible to the consumer. For example, plant material will typically lose its natural colouration during the processing of the material, in particular during the drying process. It may therefore become difficult for the plant material to be identified and distinguished from other plant materials, including for example the tobacco material used in the tobacco rod. There is also a risk that any discoloured particles of plant material within a filter may be mistaken for a foreign material.

It would be desirable to provide method for the production of flavour granules for a smoking article, wherein the flavour granules are formed of a plant material and wherein the colouration of the granules is controlled. It would be particularly desirable to provide a method for producing flavour granules such that the effect of the colouration on the flavour release of the flavour granules is minimised.

According to the present invention there is provided a method for the production of a flavour granule for a smoking article, the method comprising the steps of: forming an inner core by compaction of particles of herbaceous plant material; providing a coating suspension of coloured binder particles comprising at least one colourant and at least one polymeric binder in a solvent; applying the coating suspension to the outer surface of the inner core to form an outer layer, wherein the coating suspension is applied to the inner core within a coating system and wherein within that coating system the vapour pressure of the solvent is greater than 5 kPa; and drying the outer layer to evaporate the solvent.

The flavour granules for a smoking article obtained by methods according to the present invention comprise an inner core of herbaceous plant material for releasing flavour compounds into the smoke during smoking, onto which has been deposited an outer layer formed of a plurality of coloured binder particles. The deposition of coloured binder particles on the surface of the inner core advantageously enables the colouration of the flavour granules to be controlled. The flavour granules can therefore be provided with a desired colouration, for example, to enhance the natural colouration of the plant material of the inner core, or to replace any colouration of the plant material that may have been lost during processing of the inner core.

The colouration of the flavour granules by the porous outer layer enables the granules to be visually distinct compared to any tobacco material within the smoking article, so that the granules can be clearly distinguished and readily identified as a flavourant material. The colouration additionally reduces the risk of the flavour granules being mistaken for foreign material within the smoking article. These benefits may be of particular interest in the case of smoking articles wherein the flavourant is at least partially visible to the consumer, for example, through the filter wrapper.

The coloured binder particles are deposited on the outer surface of the inner core to provide an agglomeration of particles defining a permeable outer layer. In the context of the present invention, the term "permeable" is used to define an outer layer that is permeable to the volatile flavour compounds released from the inner core during smoking such that the volatile flavour compounds can pass around the particles of coloured binder and into the smoke. The outer layer therefore preferably has a minimal impact on the release of flavour from inner core.

The necessary permeability is typically achieved by providing an agglomeration of coloured binder particles that has an open structure providing sufficient passageways for the volatile flavour compounds to escape from the inner core. Preferably, the outer layer is porous, having a network of open pores or spaces that allow the volatile flavour compounds to pass through the outer layer.

The coloured binder particles comprise at least one colourant supported on a polymeric binder, which acts as a vehicle for the colourant and binds the colourant to the outer surface of the inner core. Suitable colourants would be known to the skilled person. The colourant may be selected to provide substantially the original colour of the plant material, or a different colour.

Preferably, the permeable outer layer comprises at least about 50 percent by weight, more preferably at least about 60 percent by weight of the at least one colourant, based on dry weight. Preferably, the permeable outer layer comprises no more than about 75 percent by weight, more preferably no more than about 70 percent by weight of the at least one colourant, based on dry weight.

Preferably, the at least one colourant includes a pigment to provide the desired colouration of the flavour granules. Preferably, the pigment is a food grade pigment. The pigment may be an organic pigment or an inorganic pigment. The pigment may be natural or synthetic. The colourant may alternatively be in the form of a dye compound.

Suitable colourants include but are not limited to Carbo medicinalis vegetabilis (E153), Brilliant Black BN (E151), Cochineal Red A (E124) Fast Red E, Sunset Yellow FCF (E110), Orange GGN, Indigotin I (E132), Amaranth (E123), Tartrazin (E102), gold leaf (E175), silver (E174), bronze, aluminium (E173), calcium carbonate (E170), calcium sulphate (E516), titanium dioxide (E171), iron oxides and hydroxides (E172), iron (III) sulphate and combinations thereof.

Where the coloured binder particles comprise a pigment, the ratio of the pigment to the cellulosic binder is preferably between about 1:1 and about 3:1, more preferably between about 3:2 and about 2:1.

Preferably, the permeable outer layer comprises at least about 25 percent by weight, more preferably at least about 30 percent by weight of the polymeric binder, based on dry weight. Preferably, the permeable outer layer comprises no more than about 50 percent by weight, more preferably no more than about 40 percent by weight of the polymeric binder, based on dry weight.

The polymeric binder in the coloured binder particles preferably comprises a natural binder material wherein the term "natural" is used to refer to a binder material of natural origin or a binder material that is synthetically produced to have an identical composition to a binder material of natural origin. Preferably, the polymeric binder material comprises one or more polysaccharides and particularly preferably, the polymeric binder material comprises one or more cellulosic materials. Preferred polysaccharides include but are not limited to starch, amylase, amylopectin, maltodextrins, dextrins, cyclodextrin, polydextrose, cellulose, methylcellulose, hydroxypropyl methyl cellulose, hydroxypropyl cellulose, ethyl methyl cellulose, ethyl cellulose, sodium carboxymethyl cellulose, nitrocellulose, alpha glucan, beta glucan, gum arabic, locust bean gum, tara gum, guar gum, alginate, carregeenan and combinations thereof. In particularly preferred embodiments, the polymeric binder is ethyl cellulose or nitrocellulose.

In alternative embodiments, the polymeric binder comprises a synthetic binder material wherein the term "synthetic" is used to refer to binder materials that are produced in a chemical synthesis and that are not of natural origin or equivalent to a binder material of natural origin. Suitable synthetic binders include but are not limited to poly(glycolide), poly(L-lactide), poly(ortho ester), poly(D,L-lactide), poly(E-caprolactone), poly(lactide-co-glycolide), poly(3-hydroxybutyrate), poly(trimethylene carbonate), poly(1,5-dioxepan-2-one), poly(adipic anhydride), poly(sebacic anhydride), poly(vinyl alcohol), poly(vinyl acetate), poly(vinyl pyrrolidone) and combinations thereof.

Preferably, the permeable outer layer further comprises a plasticiser. Preferred plasticisers include but are not limited to tributyl citrate, triethyl citrate, acetyl triethyl citrate, acetyl tributyl citrate, lecithin, triacetin, dibutyl sebacate, polyethylene glycol and combinations thereof. In particularly preferred embodiments, the plasticiser is tributyl citrate or acetyl tributyl citrate.

Preferably, the permeable outer layer comprises at least about 1 percent by weight, more preferably at least 5 percent by weight of the plasticiser, based on dry weight. Preferably, the porous outer layer comprises no more than about 30 percent by weight, more preferably no more than about 15 percent by weight of the plasticiser, based on dry weight.

Preferably, the permeable outer layer corresponds to at least about 1 percent by weight, more preferably at least about 2 percent by weight of the flavour granule, based on dry weight. Preferably, the permeable outer layer corresponds to no more than about 10 percent by weight, more preferably no more than about 5 percent by weight of the flavour granules, based on dry weight. The proportion of the permeable outer layer may be varied depending upon the composition to provide a sufficient colouration of the flavour granules whilst retaining the desired level of permeability.

The permeable outer layer may optionally comprise one or more further additives. For example, the permeable outer layer may include one or more glidants to reduce the stickiness of the outer layer. Suitable glidants include but are not limited to talc, colloidal silicon dioxide, stearic acid and combinations thereof. Alternatively or in addition, the permeable outer layer may comprise one or more suspension aids such as for example xantham gum, alginate, pectin or combinations thereof.

Preferably the permeable outer layer has a thickness of less than about 20 microns, more preferably less than about 10 microns and more preferably less than about 5 microns.

Preferably, the thickness of the permeable outer layer is at least about 1 micron. The thickness will typically vary around the permeable outer layer but preferably the thickness falls within the desired range across substantially the entire outer surface of the inner core.

Preferably, the minimum thickness of the permeable outer layer is between about 1 micron and about 20 microns, more preferably between about 1 micron and about 10 microns, most preferably between about 1 micron and about 5 microns.

The inner core of the flavour granules comprises particles of herbaceous plant material. As used herein, the term "herbaceous plant material" is used to denote a material consisting of one or more parts of an herbaceous plant. The term "herb leaf" is used to denote leaf from an herbaceous plant.

An "herbaceous plant" is an aromatic plant, the leaves or other parts of which are used for medicinal, culinary or aromatic purposes and are capable of releasing flavour into smoke produced by a smoking article. The flavour granules used in the present invention may comprise herbaceous material from one or more perennial or annual herbaceous plants. For example, the flavour granules may comprise herb leaf or other herbaceous material from herbaceous plants including, but not limited to, mints, such as peppermint and spearmint, lemon balm, basil, cinnamon, lemon basil, chive, coriander, lavender, sage, tea, thyme and carvi. Preferably, the flavour granules comprise non-tobacco plant material.

The herbaceous plant material in the inner core of the flavour granules within the smoking article releases flavour during smoking, thereby altering the flavour characteristics of the smoke. Advantageously, the plant material of the flavour granules can be varied in order to tailor the flavour profile of the smoking article into which the flavour granules are incorporated. The inclusion of granules including plant material also improves retention of flavours within the smoking article compared to conventionally used liquid flavourants.

The inner core of the flavour granules may comprise one or more particles formed from any suitable part of an herbaceous plant, including but not limited to the leaves, stem, root, flower and fruit. The inner core may include plant material from one or more plants. The herbaceous plant material is cut, ground or otherwise reduced in size to provide a particulate material, which is agglomerated to form the inner core of the flavour granules.

In preferred embodiments of the present invention, the flavour released from the herbaceous plant material is provided by volatile compounds, such as oils, contained therein. Prior to smoking, the volatile compounds tend to remain trapped within the plant material, but are volatilised during smoking, thereby enriching the smoke with flavour. The flavour characteristics of the smoke can be altered depending on the plant material selected for inclusion in the flavour granules.

Preferably the inner core is formed of a compacted herbaceous plant material. By compacted, it is meant that the plant material has been subjected to a mechanical process to densify the plant material. In some instances the compaction disrupts the cellular structure of the plant material and causes at least a partial release of the essential oils in the plant material. As described further below, in one example the plant material may be extruded. Water may be incorporated into the inner core of the flavour granules as a processing aid for the compaction process. Preferably, the inner core consists of, or consists essentially of, herbaceous plant material, for example any one or more of the herbaceous plant materials discussed above. Alternatively, the inner core consists of, or consists essentially of, herbaceous plant material, for example any one or more of the herbaceous plant materials discussed above, and a processing aid as mentioned above. Particularly preferably, the inner core is free of non-aqueous binder materials.

Preferably, the flavour granules have a bulk density of at least 0.35 grams per cubic centimeter, more preferably at least 0.40 grams per cubic centimeter and even more preferably at least 0.50 grams per cubic centimeter.

In some cases, the bulk density of the original herbaceous plant material prior to compaction is around 0.20 to 0.30 grams per cubic centimeter. The compaction of the plant material to form the flavour granules preferably increases the bulk density so that the bulk density of the flavour granules is preferably at least 1.5 times, more preferably at least twice, the bulk density of the original plant material. In some cases, the plant material is compacted to yield a bulk density of more than three times that of the original plant material. Preferably, the plant material is compacted to yield a bulk density of less than 6 times the bulk density of the original plant material. For example, the bulk density of the flavour granules is preferably no more than 2.0 grams per cubic centimeter.

The term "bulk density" is used to refer to the density of the combined plurality of the flavour granules, which corresponds to the mass of the plurality of flavour granules divided by the volume occupied by those flavour granules. In the context of the present invention, the values of bulk density referred to correspond to the Carr Loose Bulk Density of the granules. A suitable method for determining the Carr Loose Bulk Density of the flavour granules is described in ASTM standard D 6393-08. In this method, a measurement is obtained by sieving the sample of flavour granules through a vibrating chute to fill a measuring cup of a known volume. The mass of flavour granules within the cup is then measured and this is divided by the volume of the cup to arrive at the bulk density.

The compaction of the herbaceous plant material concentrates the flavourants within the plant material and increases the amount of flavourants that can be provided per unit volume of the smoking article. By increasing the bulk density of the plant material, it becomes possible to incorporate a greater mass of plant material into the smoking article within the same volume of the smoking article. The flavour delivery into the mainstream smoke during smoking can thereby be improved and intensified. The compaction of the plant material may alternatively allow the same mass of plant material to be more efficiently incorporated within a smaller volume of the smoking article than the corresponding mass of the original plant material, so that the volume available for other components is increased.

As the herbaceous plant material is compressed in order to increase the density during the formation of the flavour granules, the plant material may be crushed to some extent so that the cellular structure is at least partially broken down or destroyed. In some cases, this results in the release of the essential oils in the plant material from within the cellular structure, such that a greater proportion of the essential oils are available for release into the mainstream smoke during smoking.

In preferred embodiments of the present invention, the inner core of the flavour granules comprises compacted particles of a menthol-containing herbaceous plant leaf, such as peppermint leaf. In particularly preferred embodiments of the present invention, the flavour granules comprise compacted particles of mint leaf from plants of the genus *Mentha*. For example, suitable types of mint leaf may be taken from plant varieties including but not limited to *Mentha piperita, Mentha arvensis, Mentha niliaca, Mentha citrata, Mentha spicata, Mentha spicata crispa, Mentha cordifolia, Mentha longifolia, Mentha pulegium, Mentha suaveolens*, and *Mentha suaveolens variegata*.

Preferably, the oil content of the mint leaf is at least about 0.6 percent by weight. The inclusion of particles of mint leaf, such as peppermint leaf, in flavour granules used in smoking articles obtained by methods according to the present invention advantageously provides an improved way of imparting mint and menthol flavours to the smoke of a smoking article.

The term "mint flavour" is used to refer to the flavour or the flavour extract present in mint plants, such as a peppermint plant and spearmint. The term "menthol" is used to refer to a specific flavour component present in peppermint oil and other mint oils.

It has been found that the compaction of the mint leaf to form the inner core of the flavour granules increases the proportion of the menthol content of the mint leaf that is transferred into the smoke during smoking of a smoking article incorporating the flavour granules. Therefore, not only is it possible to maximise the mass of plant material incorporated into a given volume of the smoking article through compaction of the plant material, but the compaction also improves the delivery of the menthol into the smoke. Smoking articles containing flavour granules obtained by methods according to the invention are therefore able to provide a significantly improved level of flavour delivery into the mainstream smoke.

Preferably, where the inner core comprises mint leaf, the menthol content of the flavour granules is at least about 0.25 percent by weight, more preferably at least about 0.3 percent by weight. Preferably, the essential oil content of the flavour granules is at least about 0.5 percent by weight, more preferably at least 0.8 percent by weight. Preferably, the menthol content by weight of the flavour granules is within about 0.1 percentage points of the menthol content of the inner core of the flavour granules prior to the application of the outer porous layer. This demonstrates that there is a minimal reduction of the essential oil content of the inner core as a result of the provision of the outer layer.

Preferably, the herbaceous plant material in the inner core of the flavour granules is cut before compaction in order to provide a particulate material of the plant material having an average particle size of between 0.2 mm and 5 mm. More preferably, the average particle size of the particles of plant material is between 1 mm and 2 mm. The cutting of the plant material to particles within this size range has been found to advantageously improve the adhesion of the particles to each other in the inner core.

The compaction of the herbaceous plant material to form the inner core of the flavour granules may be carried out by any suitable method. Preferably, the inner core of the flavour granules is formed by an extrusion method, in which the plant material is simultaneously compacted and shaped by being forced through an extrusion die under pressure. Suitable extrusion apparatus including, for example, screw extruders, would be well known to the skilled person. Suitable techniques for forming the granules after compaction of the plant material has been carried out include but are not limited to high shear granulation and spheronisation.

Details of suitable extrusion and spheronisation techniques can be found, for example, in "Extrusion-Spheronisation—A Literature Review" by Chris Vervaet et al, 1995 International Journal of Pharmaceutics 116:131-146.

Preferably, the moisture content of the particles of herbaceous plant material is increased to approximately 35 percent to 45 percent oven volatiles prior to compaction of the plant material to form the inner core of the granules. Preferably, the moisture content of the plant material is maintained within these limits during the compaction process. In order to achieve this, for example during an extrusion process, it may be necessary to cool the plant material and/or the compaction apparatus as the plant material is being compacted.

The moisture content of the herbaceous plant material is expressed herein as "percent oven volatiles", which is determined by measuring the percentage weight loss from the plant material upon drying the material in an oven at 103 degrees Celsius for 100 minutes. It is assumed in this test that the weight loss from the flavour material results from the evaporation of moisture from the plant material.

Once formed, the inner core of the flavour granules will typically need to undergo a drying step in order to at least partially remove the water present therein. Preferably, the formed flavour granules are dried at room temperature to a moisture content of at least 6 percent oven volatiles (o.v.) more preferably at least 8 percent o.v. Preferably, the moisture content of the formed inner cores after drying is less than 15 percent o.v., more preferably less than 12 percent o.v. and most preferably less than 10 percent o.v. For example, the moisture content of the inner cores after drying is preferably between about 6 percent and about 15 percent o.v., more preferably between about 8 percent and about 12 percent o.v. and most preferably between about 8 percent and about 10 percent o.v.

The inner core of the flavour granules may be formed into any suitable shape, but is preferably substantially cylindrical or spherical.

If desired, additional reagents may be incorporated into the mixture for forming the inner core of the flavour granules in order to aid the extrusion, spheronisation or granulation process, for example, by preventing or minimising separation of the liquid from the solid or by improving flow properties of the mixture. Suitable extrusion, spheronisation and granulation aiding reagents are well known to the skilled person. However, preferably, as described above, the only additional reagent incorporated into the inner core is water.

If it is desired to further increase the flavour loading of the flavour granules, a liquid flavourant, such as a liquid menthol flavourant may be incorporated into or onto the inner core of the flavour granules after drying. Alternatively or in addition, a liquid flavourant, such as a liquid menthol flavourant, may be added to filtration material in a filter incorporating the flavour granules, or another component of a smoking article.

Optionally, the inner core of the flavour granules may include at least one binder, which may include an organic binder material, an inorganic binder material or a combination thereof.

The permeable outer layer may be applied to the formed inner core using any suitable method. Preferably, the permeable outer layer is applied to the formed inner core through the application of a suspension of the coloured binder particles in a suitable solvent. After application of the suspension, the solvent is typically removed by a suitable drying process to leave behind an agglomeration of the coloured binder particles on the outer surface of the inner core.

A suitable solvent may be selected depending upon the conditions under which the suspension is applied to the inner core. Suitable solvents include but are not limited to ethyl acetate, methyl acetate, ethyl acetoacetate, acetone, anisole, butan-1-ol, butan-2-ol, 2-methylpropan-1-ol, 2-methylpropan-2-ol, butanone, methyl ethyl ketone, cyclohexane, cyclopentane, di-isopropyl ether, water, methanol, ethanol, propanol, diethyl ether, heptane, hexane, pentane, 2,2-dimethylpropane, trimethylpentane, xylene and combinations thereof.

In methods according to the present invention, the compaction of the particles of herbaceous plant material to form the inner core may be carried out as described above.

The outer layer is applied to the inner core in the form of a liquid coating suspension or ink, which includes the coloured binder particles suspended in a solvent. The solvent is selected such that under the conditions within the coating system in which the suspension will be applied to the inner core, the vapour pressure of the solvent is at least about 5 kPa, more preferably at least about 10 kPa.

The vapour pressure of the solvent will depend upon the temperature within the coating system. Preferably, the vapour pressure of the solvent at 25 degrees Celsius and under atmospheric pressure is at least about 5 kPa, more preferably at least about 10 kPa. Solvents having a vapour pressure within this range have a relatively high volatility.

Preferably, the solvent is an organic solvent. Particularly preferably, the solvent is an organic solvent having a boiling point of less than about 85 degrees Celsius, more preferably less than about 75 degrees Celsius at atmospheric pressure.

The boiling point of the organic solvent will be affected by the pressure conditions within the coating system. Preferably, under the conditions within the coating system the solvent has a boiling point of less than about 85 degrees Celsius, more preferably less than about 75 degrees Celsius.

Suitable solvents having the desired vapour pressure and boiling point would be known to the skilled person and a number of examples are included in the list of solvents provided above. In particularly preferred embodiments, the solvent is ethyl acetate.

In the method of the present invention, the liquid coating suspension therefore includes a solvent of relatively high volatility which evaporates readily from the outer layer. This enables the outer layer to be applied and dried at as low a temperature as possible so that the loss of volatile flavour compounds from the inner core is minimised during production. The effect of the application of the outer layer on the flavour release from the inner core is therefore minimised.

The liquid coating suspension preferably contains between 20 percent and 30 percent by weight of the coloured binder particles. The amount of the coloured binder particles in the coating suspension may be adjusted in order to control the level of coverage of the coloured binder particles on the outer surface of the inner core and therefore the permeability of the outer layer.

The amount of the liquid coating suspension applied to the inner core corresponds to between about 5 percent and about 15 percent by weight of the inner core.

The liquid coating suspension preferably has a viscosity at 20 degrees Celsius of about 100 to about 500 cps, more preferably of about 200 to about 400 cps. The viscosity may be varied depending on the selected method for the application of the permeable outer layer.

Suitable coating systems for applying the liquid coating suspension to the inner core would be known to the skilled person. In certain embodiments, the coating system may be a closed system, for example to enable the provision of vacuum conditions for the coating step. The liquid coating suspension is preferably sprayed onto the inner core using suitable spraying means provided within the coating system. Preferably, the liquid coating suspension is sprayed onto a plurality of inner cores in a fluidised state, for example in a fluidised bed sprayer, such as the Mini-Glatt system available from Glatt GmbH, Germany. Preferably, the liquid coating suspension is applied to the inner core at a temperature of no more than about 25 degrees Celsius, more preferably no more than about 20 degrees Celsius.

The coated inner core is then dried in order to evaporate the solvent, leaving behind a plurality of the coloured binder particles deposited on the outer surface of the inner core to form a permeable outer layer. The coated inner core is preferably dried in a stream of gas or air. Preferably, the drying step is carried out at a temperature of no more than about 25 degrees Celsius, more preferably no more than about 20 degrees Celsius. The solvent can be fully evaporated at these temperatures due to the high vapour pressure. The use of low drying temperatures ensures that the volatilisation of flavour compounds from the plant material in the inner core is minimised, as described above.

The size of the coated flavour granules may be controlled as required. On average, the largest cross-sectional dimension of the flavour granules is preferably at least about 0.1 mm, more preferably at least about 0.2 mm. Preferably, the largest cross-sectional dimension of the flavour granules is less than about 2.5 mm, more preferably less than about 1.5 mm. For example, the largest cross-sectional dimension is preferably between about 0.1 mm and about 2.5 mm, more preferably between about 0.2 mm and about 1.5 mm. Preferably, the particle size distribution of the flavour granules is minimised. The particle size distribution for a sample of flavour granules may be determined using a known sieve test, such as the standard Test Method described in ASTM D6913-04 (2009).

According to the present invention there is further provided a coated flavour granule produced by the method described above. The flavour granule comprises an inner core comprising compacted particles of herbaceous plant material and a permeable outer layer formed of plurality of coloured binder particles deposited on the outer surface of the inner core, the coloured binder particles comprising at least one colourant and at least one polymeric binder, wherein the permeable outer layer is permeable to the flavour compounds released from the plant material of the inner core during smoking.

Smoking articles including the flavour granules obtained by methods according to the present invention preferably comprise an aerosol generating substrate and a mouthpiece in axial alignment with the aerosol generating substrate. The flavour granules may advantageously be incorporated into a wide variety of different types of smoking articles. For example, the flavour granules may be incorporated into combustible smoking articles, such as filter cigarettes, having a rod of tobacco cut filler or other smokable material, which is combusted during smoking.

Alternatively, the flavour granules may be incorporated into heated smoking articles of the type described above in which material is heated to form an aerosol, rather than combusted. For example, the flavour granules may be incorporated into a heated smoking article comprising a combustible heat source, such as that disclosed in WO-A-2009/022232, which comprises a combustible heat source and an aerosol-generating substrate downstream of the combustible heat source. The flavour granules may also be incorporated into heated smoking articles comprising non-combustible heat sources, for example, chemical heat sources or electrical heat sources such as electrical resistive heating elements.

Alternatively, the flavour granules as described above may be incorporated into smoking articles in which a nicotine-containing aerosol is formed from a tobacco material or other nicotine source without combustion and in some cases without heating, such as those described in WO-A-2008/121610 and WO-A-2010/107613.

As used herein, the term "smoke" is used to describe smoke produced by combustible smoking articles, such as filter cigarettes, and aerosols produced by non-combustible smoking articles, such as heated smoking articles of the types described above.

The flavour granules may be incorporated into any suitable portion or component of a smoking article. For example, the flavour granules may be incorporated into a rod of smokable material or filter of a combustible smoking article, such as a filter cigarette, or may be incorporated into an aerosol-generating substrate or filter of a heated smoking article. It will be appreciated that flavour granules may be incorporated into more than one portion or component of a smoking article.

Smoking articles comprising a plurality of flavour granules according to the present invention may comprise any number of flavour granules that is suitable to provide flavour enhancement to the smoke thereof during smoking. For example, smoking articles containing flavour granules obtained by methods according to the invention may comprise between about 2 and about 25,000 flavour granules, for example between about 2 and 15,000 flavour granules.

Preferably, the smoking article comprises a filter having a flavour release segment including a plurality of the flavour granules. Alternatively or in addition, the smoking article may comprise a rod of smokable material within which a plurality of the flavour granules is dispersed.

Preferably, in a first possible arrangement, a plurality of the flavour granules is provided within a flavour release segment of a filter, wherein the flavour granules are distributed in a plug of fibrous filtration material, such as cellulose acetate tow or paper. Preferably, the flavour granules are substantially evenly distributed along the length of the plug of fibrous filtration material.

The fibres in the fibrous filtration material may be substantially aligned in the longitudinal direction of the filter and extend along substantially the entire length of the plug of fibrous filtration material. Alternatively, the fibres in the fibrous filtration material may be randomly oriented and extend part way along the length of the plug of fibrous filtration material. Optionally, a filter plasticiser may be applied to the fibrous filtration material in a conventional manner, by spraying it onto the separated fibres. Preferably, the filter plasticiser is applied to the fibrous filtration material before the flavour granules are distributed therein.

In this first possible arrangement, in smoking articles containing flavour granules obtained by methods according to the invention, the flavour segment is preferably between about 5 mm and about 22 mm in length, more preferably between about and 10 mm about 15 mm in length, most preferably about 12 mm in length.

Preferably, in this first arrangement, smoking articles containing flavour granules obtained by methods according to the present invention further comprise a mouth end segment or a mouth end cavity downstream of the flavour release segment, as described in more detail below.

Throughout the specification, the terms "upstream" and "downstream" are used to describe the relative positions of segments or components of smoking articles in relation to the direction of the smoke drawn through the smoking articles during use. For example, in a filter where the flavour release segment is upstream of a mouth end segment, the smoke is drawn first through the flavour release segment and then through the mouth end segment.

In an alternative arrangement, a plurality of the flavour granules is provided within a flavour release segment of a filter, wherein the flavour release segment comprises a cavity at least partially filled with the flavour granules. The cavity is provided between an upstream segment, for example any of the rod end segments described below, and a downstream segment, for example any of the mouth end segments described below. Preferably, at least 40 percent of the cavity is filled with flavour granules, more preferably at least 60 percent. Preferably, up to 80 percent of the cavity is filled with flavour granules, more preferably up to 100 percent. In this alternative arrangement, the cavity filters of smoking articles containing flavour granules according to the invention may be produced using known machinery for producing charcoal filters, such as that described in EP-A-1,571,933. Such machinery is available from Filtrona International Ltd., Great Britain.

Preferably, the cavity contains on average at least 0.5 mg of plant material per cubic millimeter of the cavity.

In smoking articles according to the alternative arrangement described above, the flavour release segment is preferably between about 2 mm and about 12 mm in length, more preferably between 3 mm and 8 mm and most preferably between 4 mm to 7 mm.

The loading of flavour granules in the flavour release segment of filters of smoking articles containing flavour granules obtained by methods according to the invention is preferably at least 2 mg/mm for a filter having a diameter of between about 7.5 mm and about 7.85 mm, more preferably at least 5 mg/mm and most preferably at least 8 mg/mm. The loading of flavour granules in the flavour release segment is preferably up to 16 mg/mm for a filter having a diameter of between about 7.5 mm and about 7.85 mm, more preferably up to 20 mg/mm or in certain cases up to 30 mg/mm.

The normalised loading (mg per mm) will typically be higher where the flavour granules are provided in a cavity in accordance with the second aspect of the present invention than when the flavour granules are distributed through a plug of fibrous filtration material in accordance with the first aspect of the present invention. In the first arrangement, in smoking articles containing flavour granules obtained by methods according to the present invention, the loading of flavour granules within the flavour release segment is preferably between 2 mg/mm and 20 mg/mm. In the alternative arrangement, in filters of smoking articles containing flavour granules obtained by methods according to the present invention, the loading of flavour granules within the cavity is preferably between 20 mg/mm and 30 mg/mm.

Preferably, the total loading of flavour granules within the flavour release segment is at least 20 mg, more preferably at least 50 mg and most preferably at least 75 mg. Preferably, the total loading of the flavour granules is up to 150 mg, more preferably up to 180 mg and most preferably up to 200 mg.

Preferably, at least a portion of the flavour granules within the flavour release segment is visible from the outside of the filter. For example, in certain embodiments, the flavour release segment incorporating the flavour granules may be wrapped in a substantially transparent plug wrap to provide the possibility that the flavour granules are visible from the outside of the filter. Where the flavour release segment of the filter is wrapped in a substantially transparent plug wrap, the filter may include an outer wrapper, such as a tipping paper, which incorporates one or more windows or cut outs overlying the flavour release segment. In such an embodiment, where the flavour release segment is surrounded by a transparent plug wrap, the flavour granules within the flavour release segment may be visible to the consumer through the one or more windows.

Smoking articles containing flavour granules obtained by methods according to the present invention and comprising a flavour release segment including a plurality of said flavour granules may be single segment filters, consisting of the flavour release segment only. Alternatively, smoking articles containing flavour granules obtained by methods according to the invention may comprise multi-component filters comprising two or segments. For example, smoking articles containing flavour granules obtained by methods according to the present invention may comprise multi-component filters further comprising at least one of: a rod end segment upstream of the flavour release segment and a mouth end segment downstream of the flavour release segment, as described above in relation to the alternative arrangement. One or more additional flavour release segments comprising a plurality of flavour granules formed of the same plant material or a different plant material to that of the flavour granules in the first flavour release segment may optionally be provided.

Preferably, the mouth end segment (where present) comprises filtration material. More preferably, the mouth end segment comprises filtration material that has substantially no particulate phase filtration efficiency or very low particulate phase filtration efficiency. The mouth end segment may, for example, comprise cellulosic material, such as cellulose acetate tow, or other suitable fibrous filtration material of low filtration efficiency. Where the mouth end segment is formed of fibrous filtration material, the fibres therein may extend along substantially the entire length of the mouth end segment and be substantially aligned in the longitudinal direction of the filter. Alternatively, the fibres may extend part way along the length of the plug and be randomly oriented relative to the longitudinal axis of the filter.

The mouth end segment of multi-component filters may, in some embodiments, advantageously prevent flavour granules in the flavour release segment, or portions thereof, from reaching the mouth of a smoker during smoking.

Where the mouth end segment comprises filtration material, the length of the mouth end segment is preferably between about 3 mm and about 12 mm, more preferably between about 6 mm and about 8 mm.

Smoking articles containing flavour granules obtained by methods according to the present invention may comprise a mouth end cavity downstream of the flavour release segment. For example, multi-component filters of smoking articles containing flavour granules obtained by methods according to the present invention may further comprise a mouth end cavity downstream of the mouth end segment described above. The mouth end cavity may be formed by, for example, tipping paper circumscribing the filter. The length of the mouth end cavity is preferably 6 mm or less.

The rod end segment (where present) preferably comprises fibrous filtration material. The rod end segment may, for example, comprise cellulosic material, such as cellulose acetate tow, or other suitable fibrous filtration materials such as paper. Where the rod end segment is formed of fibrous filtration material, the fibres therein may extend along substantially the entire length of the rod end segment and be substantially aligned in the longitudinal direction of the filter. Alternatively, the fibres may extend part way along the length of the plug and be randomly oriented relative to the longitudinal axis of the filter.

The rod end segment may comprise at least one sorbent capable of removing at least one gas phase constituent from mainstream smoke drawn through the filter. Preferably, the at least one sorbent is selected from the group consisting of activated carbon, activated alumina, zeolites, sepiolites, molecular sieves and silica gel.

At least one of the mouth end segment and the rod end segment may include one or more flavourants, preferably one or more liquid flavourants, to further enhance flavour delivery to the smoker during smoking. Where the mouth end segment and the rod end segment both comprise at least one flavourant, the at least one flavourant in the mouth end segment may be the same as or different to the at least one flavourant in the rod end segment. Furthermore, the liquid flavourants in the mouth end segment and the rod end segment may provide the same or different flavour to that of the flavour granules in the flavour release segment of the filter.

Suitable flavours to be provided by liquid flavourants in the mouth end and rod end segments of multi-component filters of smoking articles containing flavour granules obtained by methods according to the present invention include, but are not limited to, peppermint, spearmint, coffee, tea, spices (such as cinnamon, clove and ginger), cocoa, vanilla, fruit flavours, chocolate, eucalyptus, geranium, linalool and natural or synthetic menthol.

For example, at least one of the mouth end segment and the rod end segment may comprise a plug of filtration material including one or more threads impregnated with liquid flavourant. Filter plugs comprising flavourant bearing threads suitable for use in multi-component filters of smoking articles containing flavour granules obtained by methods according to the present invention, and methods and apparatuses for producing such plugs, are described in U.S. Pat. Nos. 4,281,671 and 7,074,170 and are available from the American Filtrona Company, Richmond, Va., USA.

Preferably, where the inner core of the flavour granules comprises compacted particles of mint leaf, such as peppermint leaf, at least one of the mouth end segment and the rod end segment preferably comprises a liquid natural or synthetic menthol flavourant. This further enhances the flavour released into smoke drawn through the filter during smoking and complements the menthol and mint flavours released into the smoke by the flavour granules located in the flavour release segment.

Multi-component filters of smoking articles containing flavour granules obtained by methods according to the present invention may further comprise a second flavour release segment to provide further flavour enhancement to the smoker during smoking. The second flavour release segment may include a plurality of flavour granules such as those described above for use in the first flavour release segment. Alternatively or in addition, the second flavour release segment may include tobacco leaf or non-tobacco plant leaf, or one or more liquid flavourants in any of the forms described above in relation to the mouth end segment and the rod end segment. The second flavour release segment may be provided upstream or downstream of the first flavour release segment.

Smoking articles containing flavour granules obtained by methods according to the present invention have a total nicotine free dry particulate matter (NFDPM) or "tar" delivery of up to about 10 mg, preferably up to about 6 mg, and more preferably up to about 1 mg. The "tar" delivery may be as low as 1 mg, more preferably as low as 0.1 mg. Preferably, the "tar" delivery is between 0.1 mg and 10 mg, more preferably between 1 mg and 10 mg or 0.1 mg and 6 mg and most preferably between 1 mg and 6 mg.

Preferably, the overall length of smoking articles containing flavour granules obtained by methods according to the present invention is between about 70 mm and about 128 mm, more preferably about 84 mm.

Preferably, the external diameter of smoking articles containing flavour granules obtained by methods according to the present invention is between about 5 mm and 8.5 mm, more preferably about 7.9 mm.

Preferably, where smoking articles containing flavour granules obtained by methods according to the invention comprise filters, the overall length of the filters is between about 18 mm and about 36 mm, more preferably about 27 mm.

Where smoking articles containing flavour granules obtained by methods according to the invention comprise multi-component filters, the length of each individual segment of the filters is preferably between about 5 mm and about 22 mm.

Smoking articles containing flavour granules obtained by methods according to the present invention may be packaged in containers, for example in soft packs or hinge-lid packs, with an inner liner coated with one or more flavourants.

Figure 2:
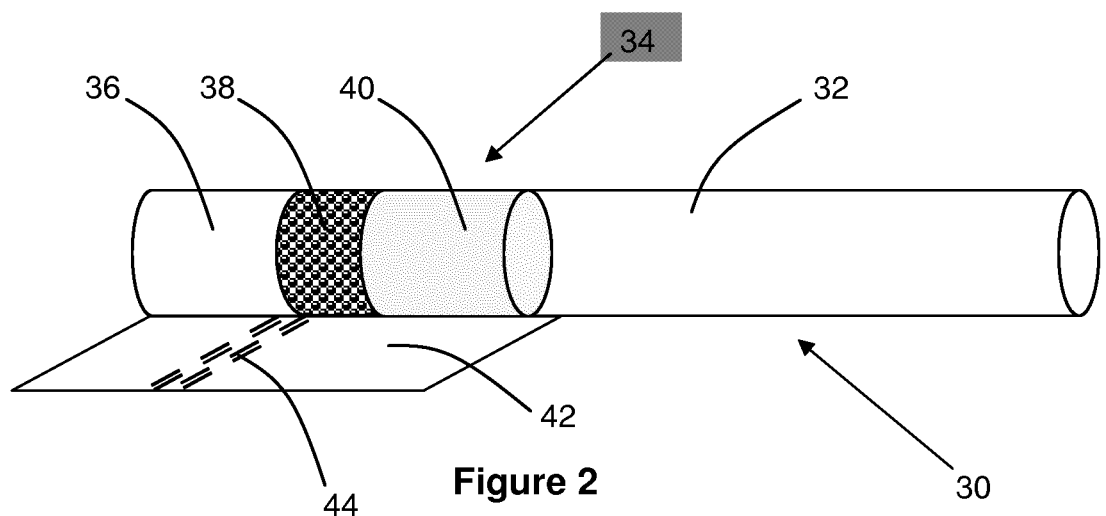

The invention will be further described, by way of example only, with reference to the accompanying drawings, in which:

FIG. 1 shows a side view of a filter cigarette containing flavour granules obtained by methods according to the present invention, comprising a single segment filter (first arrangement); and FIG. 2 shows a side view of a filter cigarette containing flavour granules obtained by methods according to the present invention, comprising a multi-component filter (alternative arrangement).

In each of the side views, portions have been broken away to illustrate interior details of the filter.

The filter cigarette 10 of FIG. 1 comprises an elongate, cylindrical wrapped tobacco rod 12 attached at one end to an axially aligned, elongate, cylindrical, filter 14.

The filter 14 of the filter cigarette 10 is a single segment filter consisting of a flavour release segment 16 adjacent to and abutting the wrapped tobacco rod 12.

The flavour release segment 16 comprises a plug of cellulose acetate tow with a plurality of green flavour granules substantially evenly distributed therein. The flavour release segment 16 is wrapped with a substantially transparent plug wrap 18.

The wrapped tobacco rod 12 and the wrapped filter 14 are joined by an outer wrapper 20 formed of tipping paper, which circumscribes the entire length of the filter 14 and an adjacent portion of the tobacco rod 12. The outer wrapper 20 comprises a circular cut-out portion 22 having a diameter of approximately 5 mm which is positioned approximately 5 mm from the rod end of the outer wrapper. The underlying substantially transparent plug wrap 18 is exposed through the cut-out portion 22 in the outer wrapper 20 and an area of the flavor release segment 16 including the green flavor granules is therefore visible through the cut-out portion 22.

Circumferential rows of perforations 24 are provided approximately 12 mm from the mouth end of the cigarette 10.

To form the filter cigarette 10 the filter 14 is produced and then joined to the wrapped tobacco rod 12, which is produced in a conventional manner, by the tipping paper 16 using known filter cigarette making equipment.

The filter cigarette 30 shown in FIG. 2 comprises an elongate, cylindrical wrapped tobacco rod 32 attached at one end to an axially aligned, elongate, cylindrical, filter 34. The filter 34 of the cigarette 30 is a multi-component filter 34 that includes three segments in abutting end-to-end relationship: a mouth end segment 36, distant from the tobacco rod 32; a flavour release segment 38 located upstream of the mouth end segment; and a rod end segment 40, located upstream of the flavour release segment 38 and adjacent to and abutting the wrapped tobacco rod 32.

The mouth end segment 36 comprises a plug of cellulose acetate tow of low filtration efficiency plasticised with glycerol triacetate.

The flavour release segment 38 comprises a cavity containing a plurality of green flavour granules.

The rod end segment 40 comprises a plug of cellulose acetate tow of medium to high filtration efficiency that, in use, partially filters out particulate phase components of the mainstream smoke.

The wrapped tobacco rod 32 and the multi-component filter 34 are joined in a conventional manner by tipping paper 42, which circumscribes the entire length of the multi-component filter and an adjacent portion of the wrapped tobacco rod 32. To ventilate mainstream smoke produced during combustion of the wrapped tobacco rod 32 with ambient air, a plurality of annular perforations 44 are provided through the tipping paper 42 at a location along the multi-component filter 34.

To produce the multi-component filter 34 of the filter cigarette 30 shown in FIG. 2, separate continuous rods comprising multiple units of each segment 36, 40 of the multi-component filter 34 are produced in a known manner.

The segments 36, 40 are then placed in a plug wrap material in a manner that creates a space between the segments 36, 40. The space is filled with the granules and then the plug wrap material is wrapped around the segments 36, 40, enclosing the granules within the space.

In each of the filters 14, 34 the flavour release segment 16, 38 contains a plurality of flavour granules having a total weight of approximately 25 mg. The flavour granules are cylindrical and have an average largest dimension of about 0.8 mm. Each flavour granule comprises an inner core formed of compacted particles of mint leaf, and a porous outer layer of coloured binder particles. Suitable flavour granules may be produced according to the example set out below.

EXAMPLE

The inner core of the flavour granules is formed from mint leaf, which has first been cut to a particle size of between 0.2 mm and 0.5 mm before being sprayed with steam to increase the moisture content of the mint leaf to between 35 percent and 45 percent oven volatiles. The wet mass of cut mint leaf is then extruded through a screw extruder to compact the mint leaf in order to increase the density, as well as shaping the mint leaf into the desired cross-sectional shape for the granules. The result extruded mass of mint leaf granules is then cut to form the inner core having a size of around 0.8 mm and the inner core is allowed to dry at room temperature.

After drying, the inner core is sprayed with a liquid coating suspension including 75 percent by weight of ethyl acetate solvent and 25 percent by weight of coloured binder particles comprising a green pigment supported on an ethyl cellulose binder. The green pigment may be formed from a mixture of Tartrazin (E102) and Indigotin I (E132), or a mixture of Sunset Yellow FCF (E110) and Indigotin I (E132). The spraying is carried out in a Mini Glatt fluidised bed sprayer with an air temperature of 24 degrees Celsius, an air pressure of 0.89 Bar and a liquid flow rate of 1 gram per minute for 5 minutes. The amount of the liquid coating suspension applied to the fluidised inner cores corresponds to about 10 percent by weight of the total weight of the inner cores.

The solvent is evaporated from the coated inner cores using a stream of air in the fluidised bed sprayer.

A menthol analysis conducted on a sample of flavour granules produced according to this example demonstrated that the menthol content by weight of the flavour granules including the permeable outer layer was within 0.1 percentage points of the menthol content of the inner cores prior to the application of the outer layer. This indicates that the loss of menthol from the inner cores as a result of the additional processing required to apply the porous outer layer is minimal.

The invention claimed is:

1. A method for the production of a flavour granule for a smoking article, the method comprising the steps of:
   forming an inner core by compaction of particles of herbaceous plant material;
   providing a coating suspension comprising between 20 percent and 30 percent by weight of coloured binder particles comprising at least one colourant and at least one polymeric binder in a solvent;
   applying the coating suspension to an outer surface of the inner core to form an outer layer, wherein the coating suspension is applied to the inner core within a coating system and wherein within that coating system the vapour pressure of the solvent is greater than 5 kPa; and
   drying the outer layer to evaporate the solvent.

2. A method according to claim 1 wherein the solvent is an organic solvent having a boiling point of less than 85 degrees Celsius.

3. A method according to claim 1 wherein the step of applying the coating suspension to the inner core is carried out in a fluidised bed apparatus.

4. A method according to claim 1 wherein a solids content of the coating suspension is at least 20 percent by weight.

5. A method according to claim 1 wherein the drying step is carried out using a flow of air at a temperature of less than 25 degrees Celsius.

6. A method according to claim 2 wherein the step of applying the coating suspension to the inner core is carried out in a fluidised bed apparatus.

7. A method according to claim 2 wherein a solids content of the coating suspension is at least 20 percent by weight.

8. A method according to claim 3 wherein a solids content of the coating suspension is at least 20 percent by weight.

9. A method according to claim 2 wherein the drying step is carried out using a flow of air at a temperature of less than 25 degrees Celsius.

10. A method according to claim 6 wherein a solids content of the coating suspension is at least 20 percent by weight.

11. A method according to claim 10 wherein the drying step is carried out using a flow of air at a temperature of less than 25 degrees Celsius.

\* \* \* \* \*